(12) United States Patent
Allport

(10) Patent No.: US 6,483,548 B1
(45) Date of Patent: Nov. 19, 2002

(54) METHOD OF DATA DISPLAY FOR ELECTRONIC PROGRAM GUIDES (EPGS)

(75) Inventor: David E. Allport, Palo Alto, CA (US)

(73) Assignee: Research Investment Network, Inc., Irvine, CA (US)

(*) Notice: Subject to any disclaimer, the term of this patent is extended or adjusted under 35 U.S.C. 154(b) by 0 days.

(21) Appl. No.: 09/221,940

(22) Filed: Dec. 28, 1998

(51) Int. Cl.$^7$ ............................................. H04N 5/445
(52) U.S. Cl. .................. 348/564; 348/563; 348/569; 348/906; 725/39; 725/49; 725/59
(58) Field of Search ................................. 348/645, 646, 348/647, 649, 651, 652, 648, 643, 644, 563, 564, 906; 725/39, 49, 48, 59

(56) References Cited

U.S. PATENT DOCUMENTS

| | | | |
|---|---|---|---|
| 5,038,211 A | 8/1991 | Hallenbeck | 358/142 |
| 5,315,392 A | 5/1994 | Ishikawa et al. | 348/570 |
| 5,353,121 A * | 10/1994 | Young et al. | 348/563 |
| 5,479,268 A | 12/1995 | Young et al. | 358/335 |
| 5,548,338 A | 8/1996 | Ellis et al. | 348/473 |
| 5,592,551 A | 1/1997 | Lett et al. | 380/20 |
| 5,596,373 A | 1/1997 | White et al. | 348/569 |
| 5,629,733 A | 5/1997 | Youman et al. | 348/7 |
| 5,630,119 A | 5/1997 | Aristides et al. | 395/601 |
| 5,651,613 A | 7/1997 | Lazarus et al. | 348/7 |
| 5,686,954 A | 11/1997 | Yoshinobu et al. | 348/13 |
| 5,689,663 A | 11/1997 | Williams | 395/327 |
| 5,710,601 A | 1/1998 | Marshall et al. | 348/564 |
| 5,710,605 A | 1/1998 | Nelson | 348/734 |
| 5,758,259 A * | 5/1998 | Lawler | 345/906 |
| 5,793,438 A | 8/1998 | Bedard | 348/569 |
| 5,801,747 A | 9/1998 | Bedard | 348/1 |
| 5,880,768 A * | 3/1999 | Lemmons et al. | 348/906 |
| 6,018,372 A * | 1/2000 | Etheredge | 348/906 |
| 6,061,097 A * | 5/2000 | Satterfield | 348/906 |
| 6,172,677 B1 * | 1/2001 | Stautner et al. | 345/352 |

* cited by examiner

Primary Examiner—John Miller
Assistant Examiner—Trang U. Tran
(74) Attorney, Agent, or Firm—Keiji Masaki; Steve A. Wong

(57) ABSTRACT

A method of displaying Electronic Program Guide (EPG) data in substantially a grid format, without using "channel" information as an axis. Instead of being presented by channel and time, the data is presented only by time. Thus, program information from multiple channels may be displayed in a single row. Various truncation algorithms allow program descriptions to be shortened, enabling placement of the descriptions into gaps or empty cells in an available row, whereas without the truncation the program description would not have fit into the gaps. For example, when there is a program X in the grid on a first line with at least one gap, and another program Y in the grid on a second line, where Y spans a time slot corresponding to at least one of the gaps on program X's line, either X's title or Y's title, or both, can be truncated, and Y's title can be moved to X's line. Another opportunity occurs when there is a program X that runs for an extended period of the day, representing "ongoing" content, such that the exact start and end time of the program adds little value to an EPG display. Its listing in the EPG grid may be truncated at start and/or end as needed, to allow its placement in any available empty cell or cells. Another aspect of the invention involves using the techniques described above to display EPG data for multiple categories on the same display.

11 Claims, 9 Drawing Sheets

G3

| Saturday Night Live (34) | | A night in the life of Jimmy R.. (8) | |
|---|---|---|---|
| Andy Griffith (36) | Family Ties (36) | Wayne's World 2 (1993) ** .. (10) | |
| Wings (44) | Wings (44) | NewRadio (12) | Grace Under..(12) |
| The Egg and I (1947) *** (NR) (15) | | | |
| Hercules in New York (1970) * (G) (19) | | | |
| Empty Nest (24) | Empty Nest (24) | Coach (24) | Coach (24) |
| <<Chungking Express (1994).. (61) | | Kids in the H.. (34) | The Hot Roc.. (29) |
| | | | Movie Movie.. (41) |
| | Liar Liar (1997) ** (PG-13) (11:40) (47) | | |

105, 90, 50, 47, 80, 5, 85, 100

| | | | | |
|---|---|---|---|---|
| FXP 8 | | | A night in the life of Jimmy R.. | |
| HBOP 10 | | | Wayne's World 2 (1993) ** .. | |
| UPN 12 | | | NewRadio | Grace Under.. |
| AMC 15 | The Egg and I (1947) *** (NR) | | | |
| TNTP 19 | Hercules in New York (1970) * (G) | | | |
| WGNSAT 24 | Empty Nest | Empty Nest | Coach | Coach |
| ENCORE 29 | | | | The Hot Roc.. |
| COMEDY 34 | Saturday Night Live | | Kids in the H.. | |
| KICU 36 | Andy Griffith | Family Ties | | |
| TMCP 41 | | | | Movie Movie.. |
| USAP 44 | Wings | Wings | | |
| STARZP 47 | | Liar Liar (1997) ** (PG-13) (11:40) | | |
| SUNDAE 61 | <<Chungking Express 1994 .. | | | |

FIG. 2
(PRIOR ART)

| Saturday Night Live (34) | | A night in the life of Jimmy R.. (8) | |
|---|---|---|---|
| Andy Griffith (36) | Family Ties (36) | Wayne's World 2 (1993) ** .. (10) | |
| Wings (44) | Wings (44) | NewRadio (12) | Grace Under..(12) |
| The Egg and I (1947) *** (NR) (15) | | | |
| Hercules in New York (1970) * (G) (19) | | | |
| Empty Nest (24) | Empty Nest (24) | Coach (24) | Coach (24) |
| <<Chungking Express (1994).. (61) | | Kids in the H.. (34) | The Hot Roc.. (29) |
| | | | Movie Movie.. (41) |
| | Liar Liar (1997) ** (PG-13) (11:40) (47) | | |

FIG. 3

|  |  |  | G4 |
|---|---|---|---|
| Saturday Night Live | | A night in the life of Jimmy R.. | |
| Andy Griffith | Family Ties | Wayne's World 2 (1993) ** .. | |
| Wings | Wings | NewRadio | Grace Under.. |
| The Egg and I..>> | Liar Liar (1997) ** (PG-13) (11:40) | | |
| Hercules in New York (1970) * (G) | | >> | Movie Movie .. |
| Empty Nest | Empty Nest | Coach | Coach |
| <<Chungking Express (1994).. | | Kids in the H. | The Hot Roc.. |

110 → The Egg and I..>>
95 → Hercules in New York
115 (callouts)

FIG. 4

|  |  |  |  |  |
|---|---|---|---|---|
| FOX 2 |  |  |  | Judge Mills L. |
| FXP 8 | NYPD Blue |  |  |  |
| HBOP 10 | << 'Til There Was You (1997) .. |  |  |  |
| WB 13 | The People's Court |  |  |  |
| GOAC 16 | Government Access |  |  |  |
| PRGU 21 | Prevue Guide |  |  |  |
| LIFEP 27 | Chicago Hope |  |  |  |
| SHOW 40 | << How Green Was My Valley.. | Little Heroes (1992) ** (G) .. |  |  |
| ANIMAL 43 | Animal Doctor | Judge Wapn.. |  |  |
| MAXP 45 | << Mr Winkle Goes to War .. | The Beniker Gang (1985) ** (G) |  |  |
| KSTS 48 |  |  | Yo No la Mate (1993) (NR) |  |
| SUNDAE 61 |  |  | Senso (1954) ** (NR) |  |
| ODSY 63 |  |  | Challenge of a Lifetime (1985).. |  |
| TCM 68 | Cat on a Hot Tin Roof (1958) *** (NR) |  |  |  |
| PUAC 77 | Public Access |  |  |  |

FIG. 6

| | | |
|---|---|---|
| NYPD Blue | | Judge Mills L. |
| << 'Til There Was You (1997) .. | Yo No la Mate (1993) (NR) | |
| The People's Court | Senso (1954) ** (NR) | |
| Government Access | | |
| Prevue Guide | | |
| Chicago Hope | Challenge of a Lifetime (1985).. | |
| << How Green Was My Valley.. | Little Heroes (1992) ** (G) .. | |
| Animal Doctor | Judge Wapn.. | |
| << Mr Winkle Goes to War .. | The Beniker Gang (1985) ** (G) | |
| Cat on a Hot Tin Roof (1958) *** (NR) | | |
| Public Access | | |

FIG. 7

| NYPD Blue | | Judge Mills L. | |
|---|---|---|---|
| << 'Til There Was You (1997) .. | Yo No la Mate (1993) (NR) | | |
| The People's Court | Senso (1954) ** (NR) | | |
| Chicago Hope | Challenge of a Lifetime (1985).. | | |
| << How Green Was My Valley.. | Little Heroes (1992) ** (G) .. | | |
| Animal Doctor | Judge Wapn.. | | |
| << Mr Winkle Goes to War .. | The Beniker Gang (1985) ** (G) | | |
| Cat on a Hot Tin Roof (1958) *** (NR) | | | |
| << Government Access >> | <<Public Ac>> | <<Prevue G>> | |

FIG. 8

METHOD OF DATA DISPLAY FOR ELECTRONIC PROGRAM GUIDES (EPGS)

RELATED APPLICATIONS

The present application is related to U.S. patent application Ser. No. 09/001,873, titled "Portable Internet-Enabled Controller And Information Browser For Consumer Devices", (hereinafter referred to as "the '873 application"), and to U.S. patent application Ser. No. 09/001,841, titled "System For Dual-Display Interaction With Integrated Television And Internet Content", (hereinafter referred to as "the '841 application"), both filed on Dec. 31, 1997. The disclosures of both related applications are incorporated herein by reference.

FIELD OF THE INVENTION

The present invention relates generally to methods of displaying data, and more particularly to methods of displaying electronic program guide (EPG) data in a grid format.

DEFINITIONS

Generally, as used in this application, "content" refers to the substance or material being viewed or heard, such as an actual TV program, movie, etc. The content is typically identified intuitively by title, such as *Seinfeld, Gone With The Wind*, etc., and this type of identifying information is referred to as "title-based" information. This is to be distinguished from information that identifies the physical hardware characteristics of the location or source of the information, including but not limited to channel, frequency, track, CD slot, etc. Though the two types of information (title-based versus source-based) are generally mutually exclusive, there are situations where they may overlap. For example, phrases such as "FOX News" or "Channel 11 News" do in fact contain source-based information, but the phrases are generally considered title-based, because a viewer would use such a phrase when referring to the content of the program, to distinguish the program from other news broadcasts. Basically, the identifying information in the title of news programs is generally an indication of the actual source or channel of the news, because "news" would not in and of itself convey to a user which news broadcast the title "news" would be referring to.

The concept of title-based information, along with associated benefits of its use such as "title-based direct access control", are discussed in more detail in the above-referenced related applications, and particularly in the '873 application. For ease of reference, however, "title-based direct access control" may be briefly described as the ability of a viewer to choose entertainment content by directly selecting the title of the desired content, as opposed to having to select based on source-based criteria such as channel.

Also as used in this application, the terms "user", "viewer", and "consumer" are used interchangeably depending on the context, to refer to a person using the methods and devices described herein. A "logical user" may be a single user, or a group of users having shared or aggregated program preferences. For example, "kids" may be a logical user, for which program preferences are determined by a parent. Or "critics' choice" may be a logical user, for which program preferences are determined by a group of program critics. Or "default" may be a logical user, for which program preferences are determined by a predetermined or random algorithm.

"Program" is used to refer to a television broadcast program, satellite broadcast program, cable broadcast program, or any other program that is generally scheduled to begin airing at a predetermined time, and air for a predetermined time, as determined by the program content provider. A program is said to air substantially continuously for a period if it airs during that period without interruption by any other scheduled program. This is despite interruptions in the program due to commercials, news flashes, or other temporary and/or unscheduled events.

"Displayed period" is used to refer to the time that is represented on the axis of a given display. For example, if the given display showed program content airing from 11 am to 1 pm, then the displayed period is 11 am to 1 pm.

"Cell" refers to a logical space in a logical grid. Thus, a logical grid merely defines the logical boundaries that separate the logical cells. It is common in the art to physically represent a logical grid by a series of intersecting vertical and horizontal lines, which delineate columns and rows. Typically, the physical representations of the horizontal lines, which typically delineate channels, are complete, while the physical representations of the vertical lines, which typically delineate time boundaries, may be discontinuous due to programs that span across more than one continuous cell within a single row. A cell holds program description or program content information such as a title. The program description or program content information may comprise a title, a graphic representation of the program content, or any other descriptive information to convey at a glance the actual program content referred to. A single cell, or a group of continuous cells within a row, is also referred to sometimes as a "time slot" within the given row, because generally the horizontal axis on the display grid represents time.

BACKGROUND

The traditional method of displaying TV program information for multiple TV channels is to show a grid with the time of program on one axis (typically the X-axis), and the program's channel on the other axis (typically the Y-axis), with program content displayed in the associated cells that represent the intersection of a time's column and a channel's row. This is a natural way to organize this information for the traditional control procedure, wherein the user presses numbers on a TV remote controller that correspond to the channel for the desired program, or changes through neighboring channels sequentially using the channel "up" and "down" buttons until arriving at the desired channel. Thus, identification of the TV channel carrying a desired program is necessary to locate the desired program for viewing, whether from broadcast, cable, satellite, internet video, video on demand, or other distribution mechanism.

However, channel numbers are not the most intuitive decision criterion in determining what to watch on TV. That is, viewers typically do not determine that they want to watch channel 87, and then tune to channel 87 and watch whatever is there. Instead, viewers typically determine the content of what they want to watch, usually based on title such as *Seinfeld, Gone With The Wind, Wheel of Fortune*, etc., or at least they choose a category of entertainment such as drama, comedy, suspense, etc. The primary and most intuitive criterion for deciding what to watch is thus program content, and only after viewers decide which program content they want to watch, does it become important to know on what channel that content is available. Knowledge of the channel is needed to view the desired content because viewers must send commands to the TV or other device indicating on what channel the desired content can be found, so that the tuner can tune to the desired channel.

Thus, it is more intuitive for viewers to see, browse, select, and perform other functions using title-based information, than to do the same functions using source-based information. Additionally, it is beneficial for the title-based information to be sorted by category or other similar factor, so that the overall view of information identifies the content of each program, and also groups programs of a similar category together. In general, the grid format can be used to present information such as EPG data in this manner, allowing the viewer to see information about multiple programs simultaneously in a manner that is intuitive and easy to work with.

Websites are available that present TV schedule information, and include the content category information in some way. For example, http://www.excite.com ("EXCITE") shows grid listings with programs in different categories shown in different colors. EXCITE, however, displays the program information using traditional time/channel axes.

Complete application programs downloadable to a PC are also available, which present TV schedule data in the traditional grid format (plus colors for categories as with the website grids), and which further allow sophisticated user searching for specific programs, actors, etc. For example, http://www.tvhost.com ("TVHOST") allows the user to see programs listed in very specific categories (e.g. subcategories of sports such as "Gymnastics", "Live Horse Event", "Motor Sports" etc.). TVHOST, however, also displays the program information based on channel, and merely provides simple vertical lists of programs giving time, channel, and program title on each line.

Another known website, http://www.theGIST.com ("GIST"), attempts to organize TV schedule information in grids that are grouped according to categories. FIG. 1 illustrates one such grid, G1, displaying "Comedy" programs. (For convenience, "Gx", where "x" is a number, is used herein to refer to the grid of FIG. "x".) In FIG. 1, it can be seen that the information still follows the time/channel layout necessitated by the traditional TV control mechanisms as discussed herein. This leads to empty cells or gaps 5 in the schedule, where the channels listed in the rows are not airing program material in the "Comedy" category at the time indicated by the associated column.

Thus, the prior art method of organizing TV schedule grids does not use display space efficiently when showing program information sorted by category. For analytical purposes, the amount of wasted space using the prior art method may be calculated by abstracting away the stylistic elements, and even other factors for which correction techniques are known in the art, and then analyzing only the logical structure of the grid as will be described herein.

Referring to prior art grid G1 of FIG. 1, the stylistic elements include the title bar and time slot identifier rows, 10 and 15 respectively, as well as particular font types, font sizes, cell size, screen size, etc. By eliminating all stylistic elements, various display methods may be compared based on their actual display efficiency.

One measure of display efficiency is to compare, for a given amount of program information (x), the number of cells needed in a first grid to display the information, versus the number of cells needed in a second grid. This measure is referred to herein as cell-reduction percentage. If P represents the number of logical cells in the first grid prior to performing truncation or compaction methods described herein, and Q represents to the number of cells in the resulting second grid after performing the truncation or compaction methods described herein on the first grid, then the cell-reduction percentage of the second grid from the first grid is (P−Q)/ P. As an example, if a first grid has 100 logical cells, and after applying the methods described herein the resulting grid has only 90 logical cells, then P=100, Q=90, and the cell-reduction percentage of the second grid from the first grid is (100−90)/100 or 10%. That is, the truncation methods would have eliminated 10% of the logical cells from the first grid.

Another measure of the benefits of the present invention is known herein as representational efficiency. This is a measure for a single grid, and is represented by dividing the amount of information represented in the grid by the number of logical cells used. Thus, using the same example grids as above, the representational efficiency of the first grid is x/100, and that of the second grid is x/90. Converting from the first grid to the second grid would thus provide an improvement in representational efficiency of (x/90)/(x/100)=100/90. In ratio form, this equates to 1.11 to 1. As can be seen, the formula for improvement in representational efficiency when comparing two grids can be stated simply as P/Q.

The significance of measuring efficiency at the logical level will be apparent from the examples and discussion that follow. The two formulas just described, cell-reduction percentage and representational efficiency, provide alternative views of measuring the desired efficiency.

In practice, it is worth noting that cell size and font size in EPG grid displays are generally chosen such that each half-hour time slot is at least wide enough to convey basic program identity in the majority of cases. Additionally, it is known in the art to lessen the amount of wasted vertical space in certain situations by merely truncating text. Thus, as seen in FIG. 1, the vertical space 20 required due to the program title listing "Movie Movie . . . " 25, and the vertical space 30 required due to the "WGNSAT 24" source-based identifier 35, may both be reduced by merely truncating the associated texts so they occupy only a single line. This is done, for example, in the on-screen TV grids displayed on the PreVue channel.

Turning back to grid G1, when it is reduced down to its logical structure for analytical purposes, the result is grid G2 as seen in FIG. 2. As can be seen in grid G2, many gaps 5 still remain, taking up precious screen or display space on an EPG display. In addition, the entire first column 40 is devoted to merely conveying channel information, which as discussed herein is unnecessary in a system that implements title-based direct access control. In total, the 5-column, 13-row grid G2 contains 65 cells, only 32 of which contain program content information. Thus more than half of the logical space of grid G2 is wasted.

The inefficient use of display space is a shortcoming for any system that aims to convey large amounts of information quickly and easily. For any home that receives more than twenty channels of TV programming, displaying the program contents for those channels requires the representation of large amounts of information, which requires efficient display usage even on a full-sized personal computer screen or a large TV screen. However, it is especially important to use display space efficiently when presenting information on a small screen, or on a TV screen viewed at normal viewing distances. For these types of display devices, including hand-held devices which necessarily require relatively small screens, the inability to display category-sorted program information efficiently is a severe drawback.

Methods and devices that overcome the above-mentioned deficiencies in the prior art would thus be desirable, to enable viewers to view a larger amount of category-sorted and/or title-based information on a display such as a hand-held EPG display, by eliminating unnecessary gaps in the display.

SUMMARY OF THE INVENTION

The present invention relates generally to methods of displaying data, and particularly to methods of displaying EPG data that is sorted by category or is otherwise limited to selected programs, such as only black and white movies, only movies released within a certain date range, only programs with specified audio characteristics, or any other criteria. Program content information is displayed with improved efficiency of display space use. Since title-based direct access control renders sorting by channel unnecessary, the logical program content information in grids that do not use channel as an axis may be compressed into a much more efficient space, instead of leaving gaps at locations representing time slots wherein a particular channel is not airing a program of interest. The amount of program information that can fit on a given display is thereby increased. This is especially useful with systems having relatively small display areas, such as the hand-held devices described in the '873 application and in the '841 application.

In its simplest form, the methods of the present invention involve eliminating the program channel column 40 of a prior art grid such as grid G2, and packing program information from multiple programs originating from multiple channels into single rows. In one embodiment of the present invention, the horizontal axis of the grid represents time, but the vertical axis is unused. In this embodiment, the program information may still be arranged vertically according to a criterion such as a user-preference ranking, TV rating, or any other selected characteristic or preference. In another embodiment, the vertical axis is used to represent program categories. Prior art methods of representing TV schedule grids do not do this, because without title-based direct access control, it would be extremely confusing and non-intuitive for a user to access a desired program. With title-based direct access control, however, this method provides an easy, intuitive, and efficient way to view EPG data sorted by content-based criteria that are meaningful to each individual user.

In addition to removing source-based information as an axis, various truncation algorithms, some of which are known in the art, allow for the elimination of even more potential gaps in the EPG display. For example, a first technique, (a), is used to truncate the program description when the program description cannot fit completely within its associated logical timeslot due to the number of characters, graphical icons, etc. associated therewith. A second technique, (b), is used to "truncate" a timeslot when a program's actual timeslot covers a period not within the displayed period. This would occur, for example, if a program that aired during a part of the displayed period either: (1) began during a time in the displayed period and ended at a time beyond the displayed period; or (2) began at a time not in the displayed period and ended at a time in the displayed period; or (3) began at a time not in the displayed period and also ended at a time not in the displayed period.

Both techniques (a) and (b) are known in the art, but have been used only with grids utilizing time/channel axes. Additionally, these techniques are used only after program descriptions to be displayed are assigned to their respective cells. These techniques then merely determine the actual text to be displayed in those cells. These techniques do not consider whether program information for a particular program may be displayed in a cell other than the cell to which it has already been assigned. Thus, neither technique (a) nor (b) directly affect reducing the number of logical cells required to present a given amount of logical information. Instead, they both involve merely taking program information for particular programs assigned to particular cells, and determining the actual text to be displayed in those cells.

The techniques of the present invention, on the other hand, directly concern reducing the number of logical cells in an EPG grid. They allow for program information for a particular program to be placed in any one of many available cells in the EPG grid, thus providing more flexibility in the overall arrangement of how the necessary information will be displayed. One of these techniques, (c) is used when there is a program X in the grid on a first line with at least one gap, and there is another program Y in the grid on a second line, where Y spans a time slot that corresponds to at least one of the gaps on program X's line. In that situation, either X's title, Y's title, or both can be truncated, and Y's title can be moved to X's line. The result is that program title descriptions for multiple programs from multiple channels appear on the same line. This is not feasible with grids using time/channel axes, due to the requirement in such grids that each entry on a given line must air from the same channel.

Another technique, (d), of the present invention, is used when there is a program X that runs for an extended period of the day, representing "ongoing content", such that the exact start and end time of the program adds little or no value to an EPG display. Its listing in a category-oriented grid may be truncated at start and/or end as needed, to allow its placement in any available empty cell or cells.

Another aspect of the present invention involves using the techniques described above to present EPG data for multiple categories on the same display.

Other objects and advantages of the present invention will be apparent from the detailed description which follows, when read in conjunction with the associated drawings.

BRIEF DESCRIPTION OF THE DRAWINGS

FIG. 2 is a representation of the underlying logical structure of the grid in FIG. 1.

FIG. 3 is a representation of the improved result obtained over the underlying logical structure of the grid shown in FIG. 2, by combining information from multiple channels onto a single row.

FIG. 4 is a representation of the improved result obtained over the underlying logical structure of the grid shown in FIG. 3, by using truncation algorithms associated with title-based direct access control.

FIG. 6 is a representation of the underlying logical structure of the grid in FIG. 5.

FIG. 7 is a representation of the improved result obtained over the underlying logical structure of the grid shown in FIG. 6, by combining information from multiple channels onto a single row.

FIG. 8 is a representation of the improved result obtained over the underlying logical structure of the grid shown in FIG. 7, by using additional truncation algorithms associated with title-based direct access control.

DETAILED DESCRIPTION OF THE INVENTION

Figure 1:
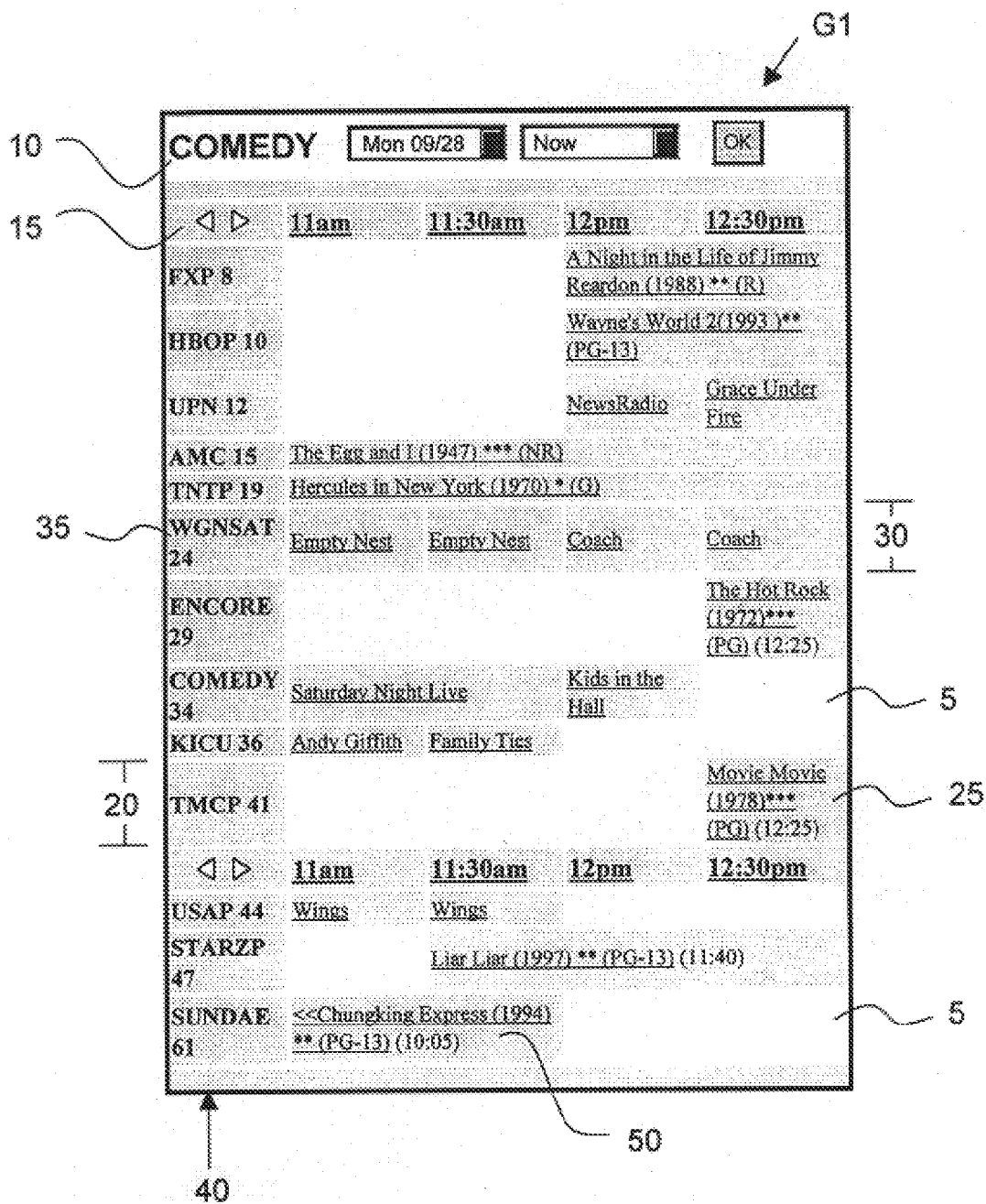
FIG. 1 illustrates an example of how the prior art organizes and presents category-sorted EPG data within the traditional time/channel axes of a grid.

Title-based direct access control allows removal of the restriction on prior art EPG grids wherein the vertical position of each program must correspond to a single channel. By removing this restriction, grids displaying program information can display programs from different channels on a single horizontal line of the grid (presuming the grid is organized with time on the horizontal axis). The results obtained by doing this can be significant, as will be seen using the actual prior art grid GI (and later a second actual prior art grid G5).

It is presumed that EPG information from an outside source, such as an EPG database (not shown) is first obtained. Such databases are well-known, and some may be accessed via the internet. They contain program-related data such as title, time, channel, and other data. Sources of EPG data are also available in which the data includes information that classifies each program according to category, such as drama, comedy, news/documentary, etc. See e.g., http://www.tvdata.com/about.htm ("TVDATA").

It is also preferred that each EPG display grid discussed herein displays program information based upon criteria specified in a single user-profile. This is contrasted, for example, from an EPG display wherein information for a first user is displayed on a first row, for a second user on a second row, etc. As discussed herein, profile or preference information for various users may be stored in devices embodying the concepts of the present invention, such that any of the various users may have their preferred information displayed if desired. But any given EPG display will preferably present information to only one of those users.

Once the data is obtained, the data for a desired time period (e.g., 11 am→1 pm) is accessed for all programs of a desired category (e.g., "Comedy"), spanning all available channels. The data is then processed as follows. For each channel, the data is parsed, and if the channel has program content information for all the time slots in the displayed period, the information is stored (and ultimately displayed) as a row of information in the logical grid. This is the case, e.g., for the "WGNSAT 24" row 45 in grid G2, which appears as a single row 47, in grid G3 as a result of using the methods described herein. If, on the other hand, the channel for which data is being parsed has gaps 5 in certain time slots, the data for other channels is parsed for program information that would fill at least one of the gaps in the first channels row. If such data is found, then it is combined with the data from the first channel to fill the available gap, and thus program information from both channels is stored (and ultimately displayed) in a single row. In grid G2, the program descriptions "<<Chunking Express (1994)" 50 from channel "SUNDAE 61" 55, "Kids in the H." 60 from channel "COMEDY 34" 65, and "The Hot Roc." 70 from channel "ENCORE 29" 75, could all be combined using this method to result in a single row 80, as seen in grid G3. The process is repeated for each non-empty row until there are no more gaps 5, or there are no more available program descriptions to fill any existing gaps 5. Any empty rows resulting would be eliminated. Using this method, and eliminating the channel column 40 of grid G2, the original 65 cells of grid G2 may be reduced to grid G3, having only 36 logical cells. Grid G3 thus presents the same amount of program content information as grid G2, but with an almost 2:1 increase in the spatial efficiency of data representation at the logical level.

In grid G3, since the channel column 40 (see grid G2) has been removed, the channels are shown at the end of the title descriptions merely to illustrate how program titles airing on multiple channels are combined into a single row. In practice, it would be desirable to generally not show the channels, as they take up extra space and are of little if any use to a user taking advantage of a title-based direct access control system. However, in situations involving program descriptions that might be considered partially title-based and partially source-based (such as the titles of news broadcasts), the title itself might include the channel, as described earlier (i.e., "FOX 11 NEWS"). In either case, systems taking advantage of the methods of the present invention could easily allow for extensive use of user preferences in determining the exact format of information displayed.

The present invention allows an even greater compression of data than seen in grid G3, by using additional truncation or gap reduction techniques. Though truncation is generally known in the art, and consumers are familiar with the practice in EPG display grids, the prior art use of truncation in EPG grids extends only to cases where either:

(a) a program description is truncated because it cannot fit completely within its associated logical timeslot due to the number of characters, graphical icons, etc. associated therewith; or (b) a timeslot area is "truncated" because a program's actual timeslot covers a period not within the displayed period; or both techniques (a) and (b) are combined.

Accepted standards in the art are to use two dots ("..")to indicate a type (a) truncation, and arrows (either "<<" or ">>") to indicate a type (b) truncation.

As will be seen, however, since the channel-based grid structure of prior art EPG displays is not needed in a system incorporating title-based direct access control, new opportunities are available for gap reduction. Using grid G3 as a starting point, an even more efficient and compact data representation can be achieved by performing title truncation in an entirely new situation:

(c) if there is a program X in the grid on a first line with at least one gap, and if there is another program Y in the grid on a second line, where Y spans a time slot that corresponds to at least one of the gaps on program X's line, then either X's title, Y's title, or both can be truncated, and Y's title can be moved to X's line.

This truncation method (c) may be applied twice to grid G3, to result in grid G4 as seen in FIG. 4. In grid G3, the first instance of using gap reduction technique (c) involves "Movie Movie (41)" 85, which is the program "X", and "Hercules in New York (1970)*(G)(19)" 90, which is the program "Y". Note that these titles 85 and 90 have been combined onto a single row 95 in grid G4. The second instance of using gap reduction technique (c) involves "Liar Liar (1997)(PG-13) (11:40) (47)" 100, which is the program "X", and "The Egg and I (1947)*(NR) (15)" 105, which is the program "Y". Note that these titles 100 and 105 have been combined onto a single row 110 in grid G4.

In those examples, the title "The Egg and I" 105 has been truncated from its fuller length seen in grid G3, and although the title "Hercules in New York" 90 appears in full, the representation of its time slot in grid G4 has been truncated. The arrows (">>") 115 indicate that the program continues past the end of the cell occupied by its title in the displayed grid. The representation of the program's continuance beyond a cell boundary within the grid is analogous to the representation of a program's continuance beyond a cell boundary that forms part of the grid's border, such as is seen in the entry "Chunking Express" 50. This representation is common in the prior art, as seen for the entry "Chunking Express" 50 in grid G1. Thus, this new type (c) of program title truncation in EPG grid displays for the purpose of gap reduction should be very easy for users to understand.

In the examples described thus far in conjunction with FIG. 1 through FIG. 4, the gap reduction techniques described herein, including technique (c), resulted in the elimination of 37 of the 65 cells in grid G1. This amounts to a cell-reduction percentage of 37/65 or 57%, and an increase in representational efficiency of 65/28 or approximately 2.32 to 1.

Figure 5:
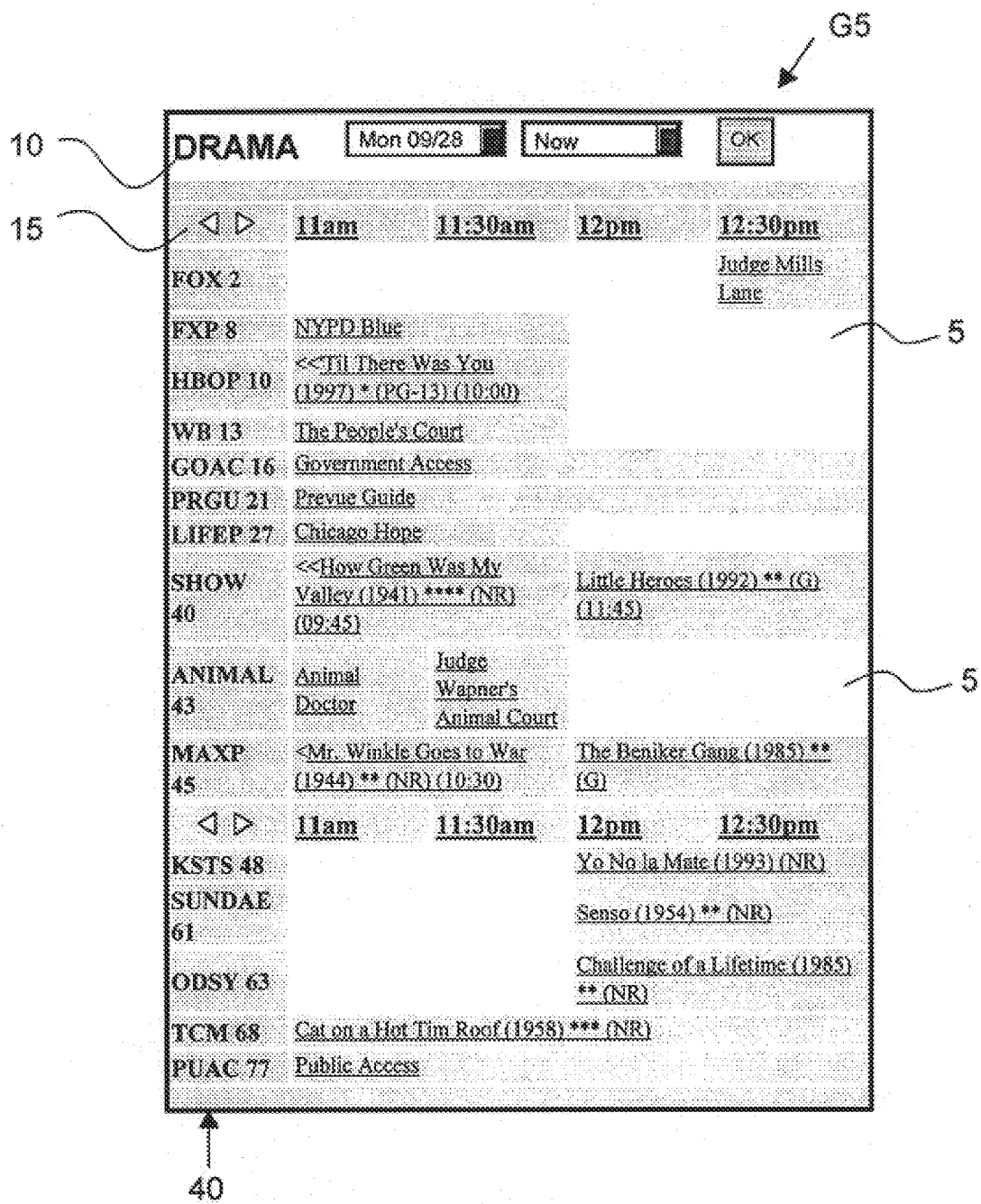
FIG. 5 illustrates a second example of how the prior art organizes and presents category-sorted EPG data within the traditional time/channel axes of a grid.

Additional methods of gap reduction according to the present invention may be illustrated by reference to a second example, for which the initial prior art grid G5 is shown in FIG. 5. Grid G5 contains data from a "Drama" category. Once again, abstracting away stylistic details of font, cell size, etc., the underlying logical structure of grid G5 is grid G6 in FIG. 6. Applying a similar procedure for gap reduction (i.e., grid compaction) to G6 that was applied to grid G2 in the prior example, the result is grid G7 as seen in FIG. 7. Grid G7 contains 44 cells, as opposed to grid G6, which contained 75 cells. Thus, in this example, 31 of the 75 cells in grid G6 have been eliminated. This represents a cell-reduction percentage of 31/75 or approximately 42%, and an increase in representational efficiency of 75/44 or approximately 1.7 to 1.

In this example, there is no opportunity for application of truncation technique (c) described earlier, but there is an additional opportunity for data compression. Channels "GOAC 16" 120, "PRGU 21", 125 and "PUAC 77" 130, in grid G6 are each showing only a single program, not only throughout the entire displayed period, but also throughout the entire day. This information, though not readily apparent from grid G6, would be known to the system that utilizes the gap reduction techniques of the present invention. For example, in each of these cases, the EPG data available might further categorize the programs as "Series/Series", indicating that the channels show the same program throughout the day. Thus, the assignment of these program titles to particular time slots does not add any useful information to an EPG display. Therefore another circumstance in which the truncation of program listings in EPG grids can lead to a more compact display without loss of data is as follows:

(d) If a program X runs for an extended period of the day, representing "ongoing" content, such that the exact start and end time of the program adds little or no value to an EPG display, its listing in a category-oriented grid may be truncated at start and/or end as needed, to allow its placement in any available empty cell or cells.

By applying truncation technique (d) to grid G7, the result is grid G8, as seen in FIG. 8. Thus instead of the original 75 cells in G6, or even the 44 cells in rid G7, the same content information may be represented in grid G8, having only 36 cells. Though there are still three gaps 5 in G8, the number of cells has been reduced from 75 in grid G6 to 36 in grid G8. That corresponds to a cell-reduction percentage of 39/75 or 52%, and an increase in representational efficiency of 75/36 or approximately 2.08 to 1. Even if the comparison of grid G8 is made against grid G7, with 44 cells, the improvement still represents a cell-reduction percentage of 8/44 or 18%, and an increase in representational efficiency of 44/36 or approximately 1.22 to 1. Grid G8 could be reduced even further if desired, by applying technique (c) to combine "Cat on a Hot Tin Roof . . . " 180 with the "Animal Doctor" row 175, by placing the former to the right of the latter and using appropriate arrows("<<").

Another technique (e) may be used, which does not address the reduction of logical cells needed to display program information as techniques (c) and (d) do, but instead better utilizes available display space. For this technique (e), if there is no need to eliminate an additional row (e.g., because there is no more program data available for the currently selected display criteria), then the gaps 5 on a particular row may be used to expand a title above or below the gaps 5 into the gaps 5. This technique (e) would preferably be used only when there could be no further benefit from using techniques (c) and (d). For example, in grid G8, the gaps 5 on the "Animal Doctor" row 175 could be utilized to expand the "Little Heroes" title 180 downward, or the "Challenge of A Lifetime" title 185 could be swapped with the "The Beniker Gang" title 190 and then extended upward. In either case, the expanded title would occupy multiple rows, but would still occupy the same timeslot it occupied prior to being expanded. The benefit is that there would be no need to use dots ("..") to indicate truncation of the title 180 or 185. A particular title may be extended across multiple rows without generating any confusion or any inaccurate representation of the program information, because the Y-axis does not represent "channel".

In general, the exact amount of increase in representational efficiency for category-oriented grids that will be derived from the application of the methods described herein, depends on the TV program data supplied. Typically, the greater the variety of categories on the different TV channels, the greater will be the gain in efficiency from using the techniques described herein, since the greater will be the number of gaps in a channel/time grid for each category.

Thus far, the gap reduction methods of the present invention have been described in connection with EPG grid displays organized according to category, wherein only one category was being displayed. However, an alternative implementation of EPG data representation according to the present invention also includes a very condensed view of all available programs, including those that are from different categories.

Figure 9:
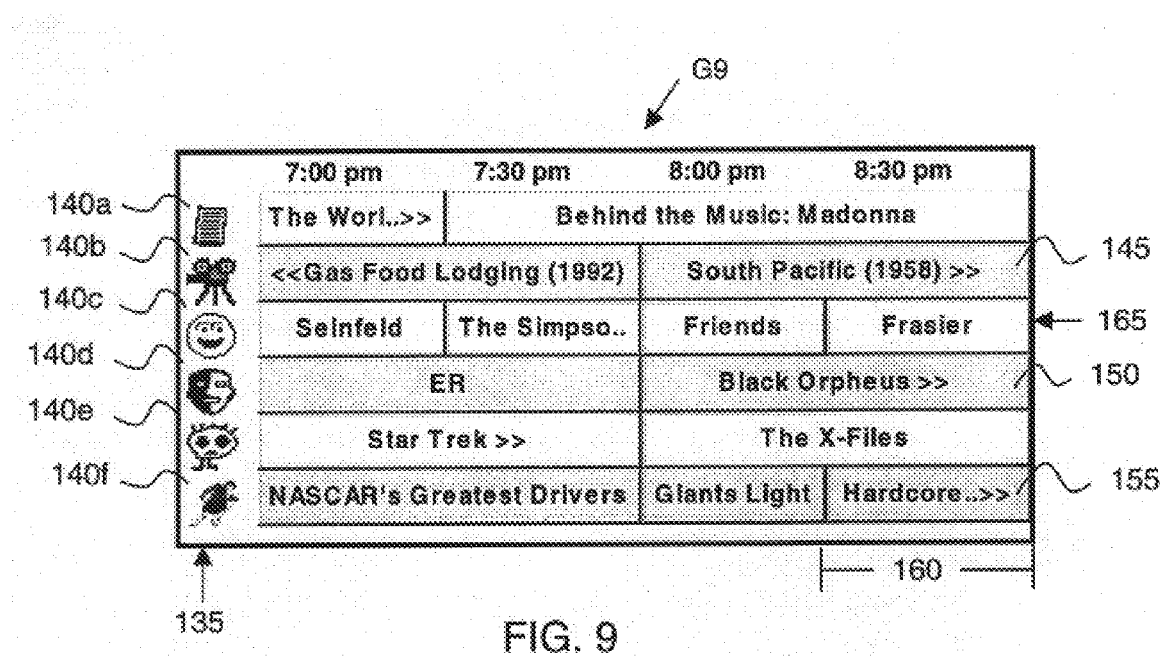
FIG. 9 shows an example of how category-sorted information is presented to a viewer using the gap reduction methods of the present invention.

FIG. 9 shows a sample screen of such a display, having a grid G9, which is readable on a small screen (e.g. ¼ VGA) or alternatively on a TV screen or other large screen at a distance. Logically, grid G9 is a 533 6 grid, with the leftmost "column" 135 containing icons 140 representing six categories of content to choose from: news/documentary 140a, film 140b, comedy 140c, drama 140d, sci-fi/fantasy 140e, and sports 140f (these are in fact the same categories into which GIST data is sorted). The term "icon" as used herein refers not only to pictorial graphics, but also to descriptive text or other information indicative of the categories associated therewith. Using the conventions described herein, it can be seen in grid G9 that the entries 145,150, and 155 for "South Pacific", "Black Orpheus", and "Hardcore Football" respectively, indicate that these programs continue past 9 pm, the end of grid G9's displayed period. In addition, the title itself in the "Hardcore Football" entry 155 is truncated to fit the 8:30→9 pm time slot 160.

Once again, it should be noted that the organzation shown in grid G9 may be altered to encompass grids of other configurations and sizes, without departing from the inventive concepts described herein. For example, the number of half-hour timeslots on the horizontal axis may be altered, the number of categories on the y axis may be altered, or the x and y axes may be swapped.

Furthermore, even if the number of categories is reduced, even down to only one category, the other category icons could still be visible, but displayed as "inactive" (such as by shadowing out, blinking, reverse video imaging, or other common means). To change a category icon from active to inactive, or vice versa, a user would merely select the icon to be changed. Correspondingly, if there is an available row in the grid, the user may choose to have multiple rows assigned to a single category. With systems that store all the data for each program including full descriptions with sub-category definitions, it is possible for users to create their own categories for the overview and category grids. For example, a user may define a "Music" category to include any program that includes the word music in the title, the sub-category, or the full description.

The comedy row 165 in grid G9 was produced using the grid compression methods discussed herein, with one more process applied; omitting certain programs. Preferably, the omissions are made only for the purposes of this "top level view", which is intended to display the user's favorite programs first, in order to make it extremely easy to make the most likely choices. If a user wants to see greater detail for a particular category, simply selecting one of the category icons (such as the "comedy" icon) will change the display to show a grid of the type we described earlier, dedicated to the single category chosen. The selection method may include a quick touch of the icon, or a touch-and-hold action, or a swipe action, or multiple touches, or any other means.

A more detailed description of how user preference files may be used to determine which programs to display in the overview grid and which to omit, can be found in the '873 application and in the '841 application, and also in U.S. Pat. No. 5,801,747, issued to Bedard, the contents of which are incorporated herein by reference. In general, the system keeps track of the programs that each individual user watches. It is therefore straightforward for the system to note, for all programs which the EPG data identifies as "series" (e.g., *Seinfeld, Frazier,* etc.), whether the user has watched an episode of this series in the past, and if so, how frequently. A user preferences file can be accumulated automatically in this way, allowing the system to prioritize the programs which should be shown in the overview grid by ranking the most frequently viewed programs highest. For programs such as movies, categorized as "one-offs", other criteria may be used for automatic prioritization of programs. The EPG data for movies typically includes names of directors, actors, age of the film, ratings, etc. Thus, a number of automatic feature matching algorithms are possible to implement a comparison between current movies which need to be sorted for display and movies that a particular user has watched in the past.

Furthermore, users may specify the features of programs that are important to them by manual means, using the user preferences screens of the systems described in the '873 application. This type of manual customization goes beyond the practices common to prior art online customizable EPGs, because prior art systems allow only for users to specify which channels they wish to see displayed or not displayed. As described in '873 application, however, users may make additional choices as to which programs within channels they wish to see displayed or not. The user may specify, for example, that on a particular channel there are only 2 programs (series) that he or she is interested in seeing displayed on the EPG grid. The impact of this is that the user is effectively thereby creating a channel listing with gaps 5 in the sense described previously herein. Therefore by using the techniques described herein, the user may see many more programs whose content is of interest within a smaller grid space.

This selective displaying may be useful for parental control, as described in the '873 application. By combining the selection process with the gap reduction techniques described herein, the resulting display may help prevent a child from realizing that certain programs are not accessible to him or her due to the parent's exercise of parental control.

In an effort to squeeze a large amount of program content data into a grid, the title truncation techniques described herein may sometimes result in less complete title information being displayed. However, with an interactive system, such as a hand-held remote control described in the '873 application, where the grid appears on a touch-screen of the hand-held remote itself, it is a very quick and easy matter for the user to see full details of any program. When the system is in browsing mode, simply touching an entry in the grid causes a pop-up display of fall program title, start and end time, as well as fuller content description, and optionally channel number and other information.

In summary, the methods described herein represent significant improvements in the method of data display for category-oriented EPG grids. The examples used herein (e.g., grids G1 and G5), represent actual prior art EPGs, and the methods described herein have been shown to result in substantial improvement in the efficiency of space usage on the EPG display (e.g., grids G4 and G8). Application of the techniques described herein are particularly useful where screen size is relatively limited. But even in other situations, it is a considerable advantage to consumers to be able to have an EPG display that presents the information in a more intuitive manner, showing all relevant data and excluding irrelevant data.

Thus, while certain embodiments are illustrated in the drawings and have just been described herein, it will be apparent to those skilled in the art that many modifications can be made to the embodiments without departing from the inventive concepts described.

For example, a programmer of ordinary skill will recognize that the exact programming algorithms used to accomplish the gap reduction techniques described herein may vary, and knowledge of such algorithms is within the ordinary programmer's skill. Furthermore, when extracting or downloading data, the extracted or downloaded data may be limited to only the data of interest to a particular user or users, or only the data needed to present the requested display (see, e.g., U.S. Pat. No. 5,038,211, issued to Hallenbeck, the contents of which are incorporated herein by reference), or the data may comprise all available data which is filtered at a later time down to the data needed. Various levels of filtering may occur during various stages of data transfer. For example, data may first be downloaded from the internet into a personal computer, advanced TV, or set-top box, and then from there loaded into a remote controller. This setup is described in more detail in the '873 and '841 applications. In such a case, it may be desirable to download a large subset of the available data into the intermediate interface, and then a smaller subset into the remote controller.

Another example is that the data may first be sorted by time within channel, time within category, channel within time, channel within category, or only by time. The data may then be stored in temporary memory while it is being adjusted to fit onto the ultimate display, or a given row may be outputted to the display once it has been completely filled even though the total display grid has not yet been logically defined. Also, the order in which the rows are displayed may vary according to program run time, alphabetical order, or any other criteria. It is thus apparent that the exact algorithms used are unimportant, so long as the desired goal is achieved.

So even though a gap reduction technique may be described herein in terms of grids, cells, moving program descriptions from one cell to another, truncating program descriptions, searching for gaps or empty cells, etc., a programmer skilled in the art will realize that the representation of these activities on paper does not necessarily correspond to the actual data structures used to manipulate the data in a computer or other memory.

Similarly, the choice of which program titles or time slots to truncate, and in what order, may take into consideration the length of the titles of programs, the number of titles that would be truncated, whether a first program title that causes a second program title to be truncated is then itself truncated by a third program title, etc. Such choices are not relevant to the present invention. For example, there may be aesthetic or other reasons for the choice of algorithms used, such as the desire that "ongoing" programs are not intermixed with non-"ongoing" programs, but rather placed only on lines with other "ongoing" program entries. It may also be desirable to limit placement of such entries to only being on an end of the displayed period, or only on the bottom row or rows of the displayed grid.

Furthermore, though the invention has been described and analyzed primarily with examples that presumed a particular logical cell must be either totally occupied or totally empty, the actual display of text or graphics, including stylistic layout elements, may cause the display area corresponding to a particular cell to include program text for more than one program description. Such cases may be regarded as cases in which the underlying logical grid is broken into finer time increments, such as only fifteen minutes, or even less. Thus, if the columns represent one half hour increments typical of programming schedules, a program description for a program that ends at 12:15 might only extend halfway through a cell in the column having a start time of 12:00 and an end time of 12:30. The latter half of that cell might be occupied by program text for another program, in accordance with the techniques described herein.

Accordingly, the invention is not to be restricted except by the claims which follow.

What is claimed is:

1. A method of displaying electronic program guide (EPG) data on a display, wherein the data is associated with a plurality of programs scheduled to air at a plurality of times throughout a calendar day, comprising:
    defining a grid on the display, said grid having a plurality of columns and a plurality of rows intersecting to form a plurality of cells, wherein each column has associated therewith a beginning time and an end of a time period;
    displaying in a first cell formed at the intersection of a first row and a first column, program information for a first program associated with a first source; and
    displaying in a second cell formed at the intersection of the first row and a second column, program information for a second program associated with a second source;
    wherein the second program is scheduled to air substantially continuously during the time period associated with the first column and the time period associated with the second column.

2. The method of claim 1, wherein the program information for the first and second programs comprises title-based information.

3. The method of claim 1, wherein the first and second programs are associated with a first program category.

4. The method of claim 3, wherein the third program is associated with a second program category.

5. The method of claim 4, wherein a first icon associated with the first program category is displayed on the display, and a second icon associated with the second program category is displayed on the display.

6. The method of claim 5, wherein the plurality of sources comprises a television broadcast channel, a cable broadcast channel, and a satellite broadcast channel.

7. The method of claim 1, wherein the second program represents ongoing content.

8. The method recited in claim 1, wherein the first program is scheduled to air substantially continuously during the time period associated with the first column and the time period associated with the second column.

9. The method recited in claim 8, wherein the first program represents ongoing content.

10. The method recited in claim 8, wherein the second program represents ongoing content.

11. A method of displaying electronic program guide (EPG) data on a display, comprising:
    defining a logical grid on the display, said grid having a plurality of columns and a plurality of rows, wherein each column has associated therewith a beginning time and an end of a time period; and
    displaying in at least two cells, program information for a first program associated with a first source, said at least two cells comprising a first cell formed at the intersection of a first row and a first column, and a second cell formed at the intersection of a second row and the first column, said first and second rows sharing a common boundary.

* * * * *

UNITED STATES PATENT AND TRADEMARK OFFICE
CERTIFICATE OF CORRECTION

PATENT NO. : 6,483,548 B1
DATED : November 19, 2002
INVENTOR(S) : David E. Allport It is certified that error appears in the above-identified patent and that said Letters Patent is hereby corrected as shown below:

<u>Title page,</u>
Item [56], References Cited, insert
-- FOREIGN PATENT DOCUMENTS
10-191193A     April 1987     Japan Pat. Off.
PCT/US99/30924     April 2000     WIPO --

Signed and Sealed this

Twenty-third Day of September, 2003

JAMES E. ROGAN
*Director of the United States Patent and Trademark Office*